Aug. 9, 1955  J. J. NEIDETCHER  2,715,044
PORTABLE ALL-WEATHER CAB
Filed Dec. 19, 1952  2 Sheets-Sheet 1

INVENTOR.
JOSEPH J. NEIDETCHER
BY
McMorrow, Berman & Davidson
ATTORNEYS

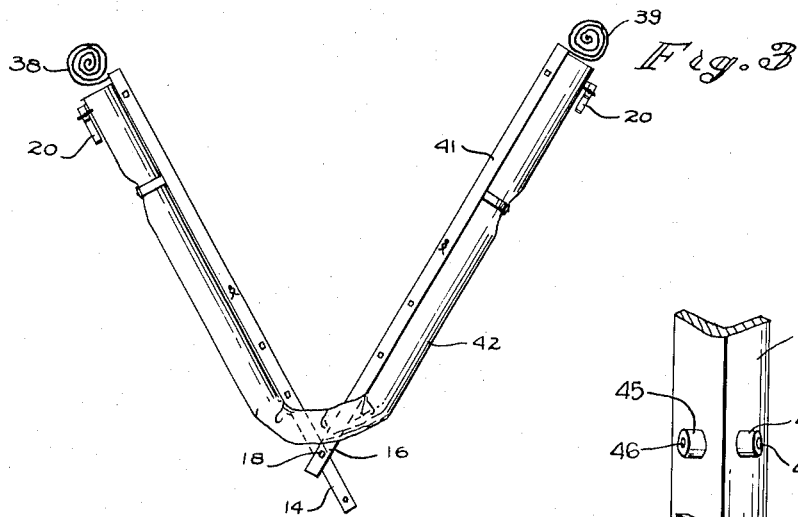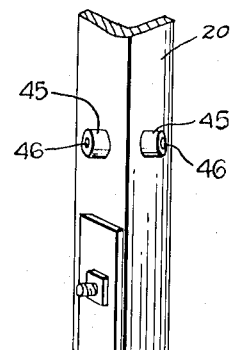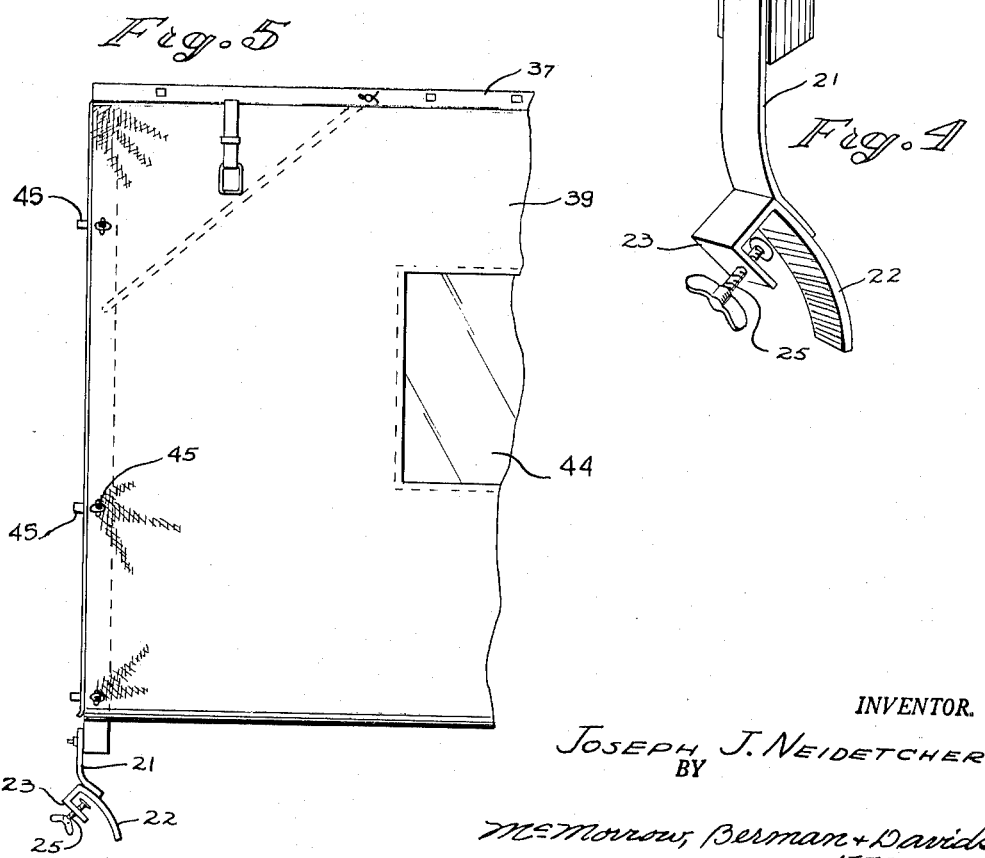

United States Patent Office 2,715,044
Patented Aug. 9, 1955

2,715,044

PORTABLE ALL-WEATHER CAB

Joseph J. Neidetcher, Arlington, Ill.

Application December 19, 1952, Serial No. 326,835

2 Claims. (Cl. 296—102)

The invention relates to folding canopies or tops for motor vehicles, and more particularly to an improved foldable cab cover or canopy for use on tractors and similar farm equipment.

The main object of the invention is to provide a novel and improved foldable cab for use on a farm tractor or similar vehicle, the improved foldable cab device being simple in construction, being easy to fold and unfold, being light in weight, and providing substantial protection from the sun and weather to persons working on tractors and other farm vehicles.

A further object of the invention is to provide an improved foldable cab device for use on a tractor or other vehicle, the improved cab device being inexpensive to manufacture, being rugged in construction, being foldable to a very compact size for convenient transportation and storage when not in use, and being easy to set up when its use is required.

Further objects and advantages of the invention will become apparent from the following description and claims, and from the accompanying drawings, wherein:

Figure 3 is a side elevational view of the foldable cab device in partly folded position.

Figure 4 is an enlarged perspective detail view of the lower end portion of one of the supporting legs of the cab device of Figures 1 to 3.

Figure 5 is a fragmentary side elevational view of the cab device, showing one of the end walls in unrolled operative position.

Figure 2:
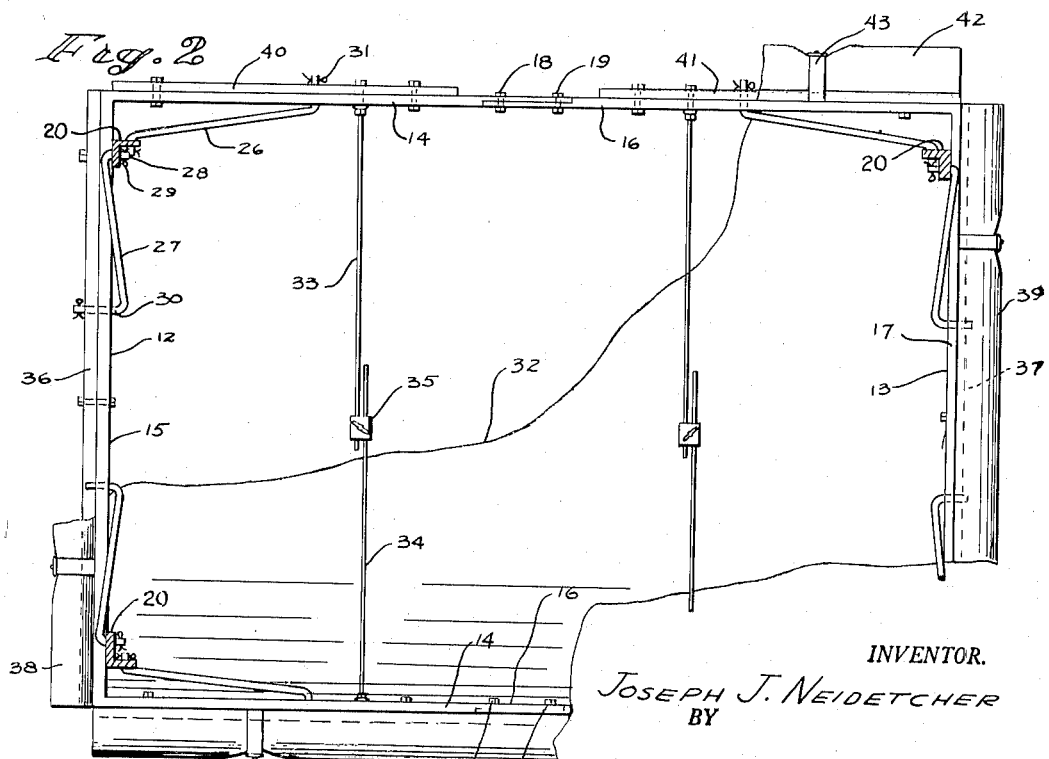
Figure 2 is a horizontal cross sectional view taken on the line 2—2 of Figure 1, looking upwardly, a portion of the top cover being broken away to clarify the view.

Referring to the drawings, the cab device is designated generally at 11 and comprises a pair of rigid, generally U-shaped frame elements 12 and 13. The frame element 12 has the longitudinal legs 14, 14 and the bight portion 15, whereas the frame element 13 has the longitudinal legs 16, 16 and the bight portion 17. The legs 14 and 16 are overlapped and are connected together by respective pairs of bolts 18 and 19 at the respective opposite sides of the frame structure. It will be noted that with the overlapping portions of the legs 14 and 16 connected by the respective pairs of bolts 18 and 19, as shown in Figure 2, a rectangular frame is defined having the opposite transverse ends 15 and 17. By removing the bolts 19, 19 the said rectangular frame is foldable at the pivot bolts 18, 18.

Figure 1:
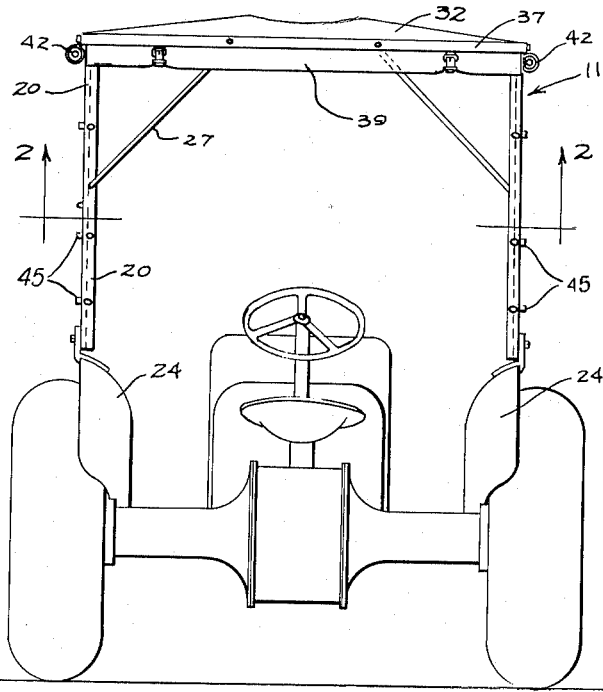
Figure 1 is a rear end elevational view of a farm tractor provided with an improved cab device according to the present invention, shown set up for use.

Pivotally connected to the respective transverse elements 15 and 17 adjacent the respective corners of the rectangular frame structure are the respective depending supporting legs 20, each leg having secured to its lower end a curved bar 21 to which is secured the arcuate bracket bar 22. Each bracket bar 22 has the C-shaped, downwardly facing hook element 23 adapted to receive the top edge of a fender 24 of a tractor, as shown in Figure 1, and the outer flange of the hook element 23 has threaded therethrough the clamping screw 25 which, when tightened, rigidly secures the associated bracket bar 21 to the fender 24.

Designated at 26 and 27 are respective pairs of strut bars provided at each corner of the frame structure, the lower ends of the strut bars being pivotally engaged through intermediate portions of the associated depending supporting legs 20, said supporting legs being preferably of angular cross section, as shown in Figure 4, whereby the lower ends of the respective associated strut bars 26 and 27 may be pivotally engaged in respective flanges of the legs, as shown in Figure 2. As shown in Figure 2, the lower ends of the strut bars 26 and 27 are bent at acute angles to the main portions of the strut bars, as shown at 28, and said lower ends are retained in the flanges of the supporting legs by employing cotter pins 29 extending through the extensions 28 in the manner shown in Figure 2. Similarly, the upper end of the strut bars 26 and 27 are formed with the angularly bent portions 30 which extend through the transverse and side elements of the rectangular top frame and are retained therein by employing cotter pins 31 in the manner shown in Figure 2. As shown in Figure 1, the strut bars are thus releasably secured to the top frame and to the depending legs 20 in inclined positions whereby the depending legs 20 are rigidly braced relative to the top frame of the structure when the foldable cab is set up for use in the manner shown in Figure 1. Designated at 32 is the top cover of flexible sheet material, such as canvas or the like which is secured at its longitudinal margins to the respective side elements 14 and 16, and at its transverse margins to the respective transverse frame elements 15 and 17.

The intermediate portions of the flexible top cover 32 are supported by a plurality of transverse brace elements comprising respective rods 33 and 34 secured to the respective opposite longitudinal side elements of the top frame and extending inwardly toward each other, as shown in Figure 2. The inner ends of the rods 33 and 34 extend through respective clamps 35 which are slidable on the inner ends of the rods 33 and 34 and which may be tightened to rigidly connect the rods 33 and 34 so as to support the flexible top cover 32. The clamps 35 may comprise opposed clamping plates which are secured together by a bolt provided with a wing nut, whereby the clamp becomes tightened when the wing nut is tightened on its bolt.

Secured to the respective transverse elements 15 and 17, as by clamping bars 36 and 37 are the flexible end walls 38 and 39 of sheet material, such as canvas or the like, the end walls being adapted to be rolled up when not in use and secured to the transverse members 15 and 17 by suitable straps, as shown in Figure 2. Secured to the respective side elements of the top frame structure, as by respective longitudinal clamping bars 40 and 41 are the flexible side walls 42, said side walls being adapted to be rolled up, as shown in Figure 2, and to be secured to the side elements 14 and 16 by suitable straps 43, as illustrated. The respective flexible walls of the cab structure may be provided with suitable windows 44 of transparent flexible plastic material, such as isinglass or the like.

As shown in Figure 1, the cab structure is supported on the respective fenders 24 of the tractor by engaging the top edges of the fenders in the hook elements 23 and tightening the screws 25. The top frame is braced rigidly to the depending legs 20 by the inclined strut bars 26 and 27, as above described, the strut bars being readily removable when it is desired to fold up the cab structure. The supporting legs 20 are provided with the spaced fastening studs 46 of conventional construction which are engageable with respective eyelets provided on the margins of the flexible walls 38, 39 and 42 for securing the flexible walls in vertical depending positions, as illustrated in Figure 5. The studs 46 may be of the conventional type having rotatable outer end portions 45 which lock the vertical marginal portions of the flexible walls to the legs 20 after the eyelets of said flexible depending walls have been engaged over the respective studs 46. Obviously, any other suitable fastening means, such as snap fasteners or the like may be employed to releasably secure the vertical marginal portions of the wall elements to the supporting legs 20.

To fold up the cab device, it is merely necessary to release the clamping screws 25, allowing the supporting legs to be disengaged from the tractor fenders 24, to then remove the struts 26 and 27, allowing the legs to be folded toward the plane of the rectangular top frame structure, and then to remove the bolts 19, allowing the side elements 14 and 16 to be folded, as illustrated in Figure 3, whereby the cab structure may be folded to a position of minimum bulk. The side curtains are, of course, rolled up to the positions thereof shown in Figure 2, and secured therein by the straps shown in Figure 2. When thus folded up, the cab structure may be readily transported or stored in any convenient part of the vehicle, and is thus available for use whenever required.

The cab device above described may be employed on tractors not provided with fenders by securing the lower ends of the legs 20 to the tractor body in any suitable manner, as by means of bolts or other suitable clamping devices.

While a specific embodiment of an improved foldable cab device for use on a tractor or similar vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A foldable cab device for use on a tractor comprising a pair of rigid U-shaped frame elements arranged so that the legs face each other in end to end relation with portions of the legs of one of said frame elements overlapping portions of the legs of the other of said frame elements, means extending through the overlapped portions of said legs and pivotally connecting said portions together, detachable fastening means spaced from said pivot connection means and extending through the overlapped portions of the legs for retaining the legs of the frame elements in end to end relation, said supporting leg positioned along the bight of each of said frame elements inwardly of and spaced from each end thereof and having the upper end connected to said bight for pivotal movement, means carried by the lower end of each leg for connection of the latter to a fender of a tractor, and a pair of strut bars each having one end detachably connected to each leg intermediate the ends thereof, the other end of one of said strut bars being detachably connected to the adjacent leg of the U-shaped frame and the other end of the other of said strut bars being detachably connected to the adjacent bight of the U-shaped frame.

2. A foldable cab device for use on a tractor comprising a pair of rigid U-shaped frame elements arranged so that the legs face each other in end to end relation with portions of the legs of one of said frame elements overlapping portions of the legs of the other of said frame elements, means extending through the overlapped portions of said legs and pivotally connecting said portions together, detachable fastening means spaced from said pivot connection means and extending through the overlapped portions of the legs for retaining the legs of the frame elements in end to end relation, a supporting leg positioned along the bight of each of said frame elements inwardly of and spaced from each end thereof and having the upper end connected to said bight for pivotal movement, means carried by the lower end of each leg for connection of the latter to a fender of a tractor, a pair of strut bars each having one end detachably connected to each leg intermediate the ends thereof, the other end of one of said strut bars being detachably connected to the adjacent leg of the U-shaped frame and the other end of the other of said strut bars being detachably connected to the adjacent bight of the U-shaped frame, a brace element extending transversely of the legs of each frame element inwardly of the overlapped portions and secured to said legs, and a flexible cover extending over the assembled frame elements and secured to the legs and bights of said frame elements.

References Cited in the file of this patent

UNITED STATES PATENTS

| Number | Name | Date |
|---|---|---|
| 723,749 | Sprague | Mar. 24, 1903 |
| 2,088,557 | Grant | July 27, 1937 |
| 2,436,736 | Westmoreland | Feb. 24, 1948 |
| 2,465,302 | Westmoreland | Mar. 22, 1949 |
| 2,539,951 | Hall | Jan. 30, 1951 |